July 24, 1956

N. B. SANDERSON 2,755,732

AIR OPERATED PICKLE PUMP

Filed Jan. 15, 1953

*INVENTOR.*
NORVAL B. SANDERSON
BY
ATTORNEY

July 24, 1956  N. B. SANDERSON  2,755,732
AIR OPERATED PICKLE PUMP

Filed Jan. 15, 1953  2 Sheets-Sheet 2

*INVENTOR.*
NORVAL B. SANDERSON
BY R. G. Story
ATTORNEY

# United States Patent Office 2,755,732
Patented July 24, 1956

2,755,732
AIR OPERATED PICKLE PUMP

Norval B. Sanderson, St. Joseph, Mo., assignor to Swift & Company, Chicago, Ill., a corporation of Illinois Application January 15, 1953, Serial No. 331,369

7 Claims. (Cl. 99—257)

The present invention relates to an apparatus for use in the injection of a pickling solution or the like into a cut of meat such as, for example, a green ham or a pork side to be processed into bacon.

The principal object of the present invention is to provide a piece of apparatus to simplify the task of the individuals who perform the operation of injecting the pickle into such a meat cut, and to lessen the operator fatigue involved in such operations.

A further advantage of the invention is that the time involved in performing the pickling operation is reduced, thereby reducing the cost of producing such products.

An additional object is to provide a device that is easily cleaned, is simple to operate, and one that is sufficiently sturdy to withstand day in and day out operations without excessive maintenance being required.

Other objects and advantages will become apparent from the following description taken in conjunction with the drawings in which.

Figure 2:
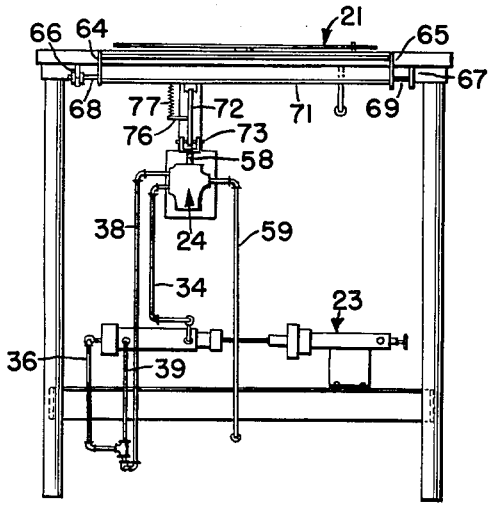
Figure 2 is a front elevation of the embodiment of Figure 1.
Figure 1:
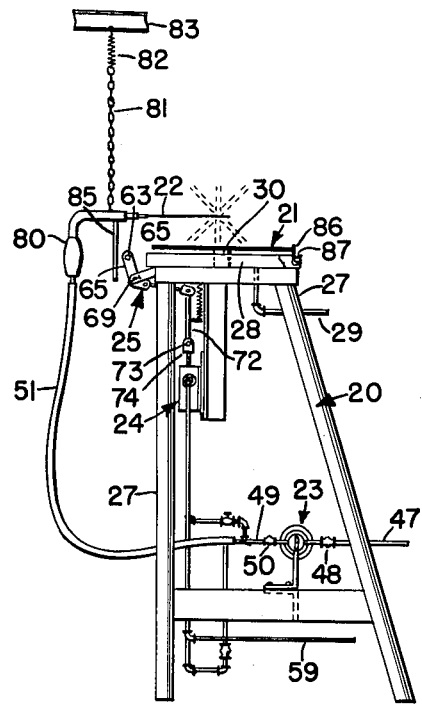
Figure 1 is an end elevation of the embodiment of the machine.
Figure 3:
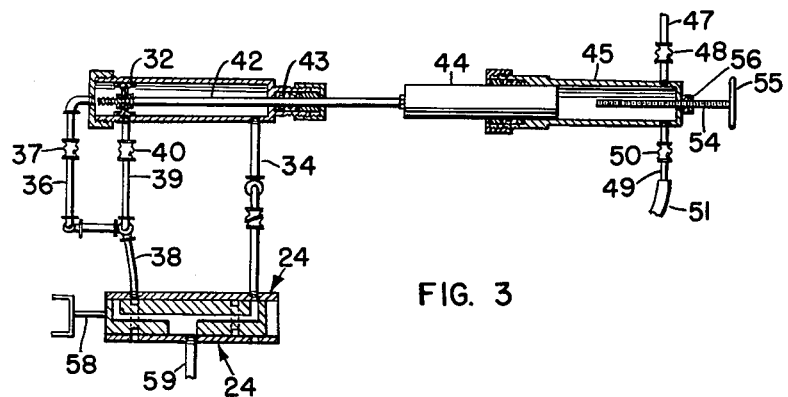
Figure 3 is a sectional view of the pump and control structure of the embodiment of Figures 1 and 2.

Referring first to the embodiment illustrated in Figures 1 through 3, the apparatus includes a frame, generally 20, having a meat cut supporting plate, generally 21, rotatably mounted thereon. The pickling solution is injected into the meat cut through a perforated needle, generally 22, to which the pickle is supplied by a supply means, generally 23, controlled by a valve, generally 24. A valve actuating means, generally 25, is used to position the valve to control a supply of pickle as desired.

The frame is made up of a plurality of legs 27 to the top of which is secured a pan 28 to catch any escaping pickle solution and drain it out through a pipe 29. A vertical pivotal member 30 is attached in the top center of pan 28 and supports the meat cut supporting plate 21.

Pickle supply means 23 includes an air operated piston 32 working in a cylinder 33. Adjacent one end of cylinder 33, a pipe 34 communicates with a 4-way valve, generally 24. At the other end of cylinder 33, a pipe 36 communicates with the 4-way valve 24 through a check valve 37 and a second pipe 38. Adjacent the same end of the cylinder 33, a second pipe 39 likewise communicates with pipe 38 through a check valve 40.

The rod 42 carrying piston 32 passes through a packing gland 43 and is secured to a second piston 44, mounted within a pumping cylinder 45. Pickling solution from a suitable source of supply is fed to pump cylinder 45 through a pipe 47, in which is a check valve 48. The pickling solution from the pump is directed to needle 22 through a pipe 49, within which is a check valve 50, which pipe communicates with a rubber hose 51.

The length of the stroke of piston 44 is determined by the position of bolt 54, threaded into the end of cylinder 45. Bolt 54 has a T-shaped handle 55 and is held in place by a pair of lock nuts 56.

Valve stem 58 controls the position of the 4-way valve 24. Air under pressure is supplied to the 4-way valve 24 through a pipe 59 from an air compressor, not shown. When valve stem 58 is extended, the valve is positioned so as to supply air under pressure from pipe 59 to pipe 34, thereby pulling piston 44 out of pump cylinder 45 to draw pickle from pipe 47 into the cylinder. When valve stem 58 is lowered (Figures 1 and 2), air from the air compressor or other suitable source, is supplied through the 4-way valve to pipe 38. The compressed air in pipe 38 is fed into the left end (Figure 3) of cylinder 33, first through pipe 36 and subsequently through pipe 39 to push pistons 32 and 44 to the right to pump the pickle from cylinder 45 out the needle 22 through the holes therein.

The valve actuating means includes a cross bar 63, extending along the front of plate 21 at an elevation just slightly below that of the plate. The ends of bar 63 are attached to a pair of straps, 64 and 65, pivotally connected to arms 66 and 67 by means of pins 68 and 69, respectively. Arms 66 and 67 are fastened to frame 20.

The lower ends of straps 64 and 65 extend beyond pins 68 and 69 and are attached to each other by a second cross bar 71. Between the ends of bar 71 is secured one end of an L-shaped rod 72. The other end of rod 72 is attached by means of a pin 73 to a U-shaped member 74, mounted on the end of valve stem 58. An outwardly extending finger 76 on rod 72 is connected by means of a spring 77 to frame 20 to resiliently urge the valve stem 58 and the valve actuating means 25 into a position such that the air pressure from pipe 59 is applied to cylinder 33 through pipe 34 to hold the pump piston 44 in the position in which pickle is not supplied to needle 22.

Needle 22 is mounted on one end of a hollow L-shaped handle 80. The opening within the other end of handle 80 communicates with hose 51 which is slipped over that end of the handle. To relieve the operator from the necessity for supporting the weight of the needle 22 and the parts attached thereto, a chain 81 and a spring 82 support these members from an overhead frame, such as beam 83.

Attached to handle 80 and extending downwardly from the portion of the handle to which the needle 22 is secured, is a contact member 85.

The meat cut in which the pickle is to be injected is placed upon plate 21 by the operator, who then inserts needle 22 into the cut by pushing against handle 80. After the needle has penetrated the cut, contact member 85 strikes cross bar 63, whereupon further movement of the needle into the cut rotates bar 63 about its mounting to lower the connecting linkage with valve stem 58 and change the position of the valve. In the changed valve position air pressure is applied to the left hand end of cylinder 33, as shown in Figure 3, while at the same time the air in the right end of cylinder 33 is exhausted to the atmosphere through the 4-way valve. This pressure pushes the two pistons to the right in Figure 3, driving pickle from cylinder 45 into the meat cut through the needle. The quantity of pickle injected is controlled by adjusting the position of stop bolt 54, thereby adjusting the length of the stroke of the pump.

Subsequently the needle is withdrawn from the cut, whereupon spring 77 changes the position of valve 24 to drive the two pistons in the opposite direction. The air trapped between piston 32 and check valves 37 and 40 serves to cushion the return movement of the piston. The return movement of the piston draws pickle into cylinder 45 from pipe 47.

To inject pickle into the other side of the cut, plate 21 is rotated approximately 180 degrees. A stop 86 is pivotally secured to the pan 28 and is resiliently urged toward the rearward edge of the pan by means of a spring 87. After plate 21 has rotated approximately 180 degrees, it strikes stop 86 to depress the stop within the pan. Continued rotation of the plate 21 frees the stop to snap back in an upright position, whereupon it holds the plate against reverse rotation when the needle 22 is pressed into the cut of meat.

Figure 4:
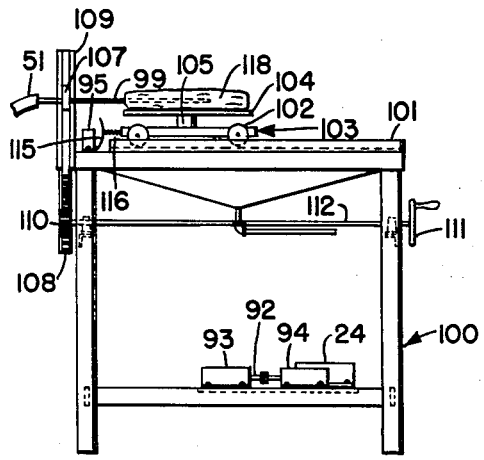
Figure 4 is an end elevation of a second embodiment of the invention.
Figure 5:
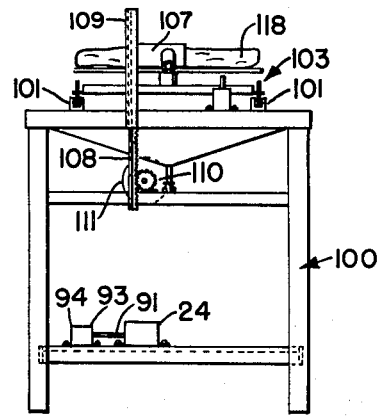
Figure 5 is a front elevation of the embodiment of Figure 4.
Figure 6:
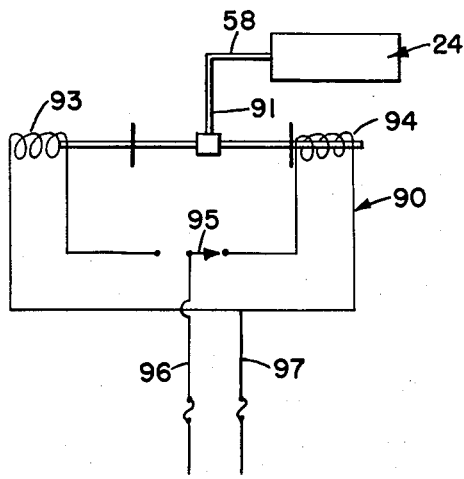
Figure 6 is a schematic drawing of the control and actuating mechanism for the embodiment of Figures 4 and 5.

In the alternative embodiment, illustrated in Figures 4 through 6, the mechanical linkage for actuating 4-way valve 24 is replaced by an electrical control, generally 90. In this case, valve stem 58 has an extending finger 91 secured thereto, which finger in turn is attached to an armature rod 92. Aligned with armature rod 92 are a pair of solenoids 93 and 94. A single pole, double-throw, switch 95 is used to alternatively connect the two solenoids with a suitable source of electrical supply through wires 96 and 97. The pickle supply means for the needle 99 of the alternative form is the same as that previously described with the embodiment of Figures 1 through 3.

The embodiment of Figures 4, 5, and 6 includes a frame, generally 100 on the top of which is mounted a pair of tracks 101. Wheels 102, forming a part of a carriage, generally 103, run in tracks 101. Carriage 103 has a supporting plate 104 pivotally mounted thereon by means of a pin 105.

Needle 99 is attached to an arm 107, one end of which is secured to a rack 108 which slides in a guide 109. A gear 110 and a hand wheel 111 are attached to a shaft 112 journaled in frame 100. Gear 110 engages rack 108 whereby the needle 99 may be moved up and down by turning wheel 111.

Switch 95, which in the illustrated embodiment takes the form of a microswitch, is attached to frame 100 in a position for the operating lever 115 of the switch to be contacted by a spring 116 extending outwardly from carriage 103.

In this embodiment the meat cut 118, into which the pickle is to be injected, is placed on plate 104. Hand wheel 111 is adjusted to position needle 99 to enter the desired portion of the depth of the cut, and carriage 103 is pushed by the operator towards needle 99 so that the needle pierces the cut. After the needle has pierced the cut, spring 116 actuates switch 95 to close the circuit through solenoid 94 and position valve 24 so as to pump the pickling solution into the cut, as previously described. When carriage 103 is drawn away from switch 95, the mechanism of the switch changes contact thereof to the original position as illustrated in Figure 6, energizing solenoid 93 and reversing the position of valve 24.

The foregoing description of specific embodiments is for the purpose of complying with 35 U. S. C. 112, and should not be construed as imposing unnecessary limitations on the appended claims. Numerous variations will be apparent to those skilled in the art, and such variations are deemed to be within the scope of the invention to the extent that they are covered by the claims.

For example, in many instances the various cuts of meat 118 will be sufficiently alike so that there is no necessity for raising and lowering needle 99 in the embodiment of Figure 4. In such a case the cross piece 107 can be permanently affixed within guide 109 and the unnecessary parts used to raise and lower the needle may be dispensed with.

In a number of instances it will be noted that one of two related parts will move with respect to the other to achieve certain operations. It will be apparent to those skilled in the art that the other of the two related parts could be moved to achieve the same effect. An example of this second type of variation is shown by a comparison of the embodiment of Figure 1, and the embodiment of Figure 4. In the former the needle 22 is moved with respect to the supporting plate 21 to insert the needle into the meat cut. In the second embodiment the supporting plate 104 is moved with respect to needle 99 to achieve the same end.

I claim:

1. A device for injecting pickle into a cut of meat or the like comprising a meat cut supporting member, a pickle injection needle member, one of said members being mounted for movement along a line toward and away from the other to insert the needle member into and remove it from the cut on said supporting member, a first of the members being movable in a direction generally normal to said line with respect to the second of the members whereby the point of insertion of the needle into the cut of meat may be controlled, pickle supply means connected to said needle member, said pickle supply means including a valve to control the flow of pickle to said needle member, and actuating means for said valve positioned to intercept said one member to cause the pickle to flow when said one member has been moved toward the other to insert the needle into the cut.

2. A device for injecting pickle into a cut of meat or the like comprising a meat cut supporting member, means for supporting said member, a pickle injection needle member, means for supporting said needle, a first of said means being movable relative to the other in a generally horizontal direction from a first to a second position whereby said needle may be inserted into a cut resting on said supporting member and to be removed therefrom when said first means is moved to said first position, at least one of said members being movable in a generally vertical direction whereby the point of insertion of the needle into the cut may be controlled, pickle supply means connected to said needle member and including a valve to control the flow of pickle to said needle member, actuating means for said valve and mounted on one of said supporting means, and a contact member mounted on the other of said supporting means and cooperating with said actuating means to cause said pickle to flow when said first supporting means is moved to the second position.

3. A device for injecting pickle into a cut of meat or the like comprising a meat cut supporting member, means for supporting said member, said member being rotatably mounted on said means, a pickle injection needle member, means for supporting said needle member, a first of said means being movable relative to the other in a generally horizontal direction from a first to a second position whereby said needle member may be inserted into a cut resting on said supporting member, and to be removed therefrom when said first means is moved to said first position, at least one of said members being movable in a generally vertical direction, pickle supply means connected to said needle member and including a valve to control the flow of pickle to said needle, actuating means for said valve mounted on one of said supporting means, and a contact member mounted on the other of said supporting means and cooperating with said actuating means to cause said pickle to flow when said first supporting means is moved to the second position.

4. A device for use in injecting pickle into a cut of meat or the like, comprising a pickle injection needle, said needle having a contact member extending outwardly therefrom, pickle supply means connected to said needle, said pickle supply means including a valve to control the flow of pickle to said needle, a frame having a generally horizontal surface thereon to support the cut, actuating means for said valve mounted on said frame, said actuating means including a control member mounted in front of said surface and at about the same elevation as that of said contact member when said needle is inserted into a cut resting on said surface, said actuating means being movable from a first position spaced from said surface at which position the valve is set for flow of pickle to be stopped to a second position closer to said surface at which position the valve is set for said pickle to be flowing, and resilient means urging said actuating means into said first position.

5. A device for use in injecting pickle into a cut of meat or the like comprising a pickle injection needle, said needle having a contact member extending outwardly therefrom, pickle supply means connected to said needle, said pickle supply means including a valve to control the flow of pickle to said needle, a frame having a generally horizontal surface thereon to support the cut, an operating bar extending across the front of said surface at about the same elevation as that of said contact member when said needle is inserted into a cut resting on said surface, said operating bar being pivotally mounted on said frame, rod means connecting said bar and said valve to position the valve to stop the flow of pickle when said bar is pivotally positioned away from said surface and to reposition the valve to cause said pickle to flow when said bar is pivoted closer to said surface, and resilient means urging said bar into said first mentioned position.

6. A device for use in injecting pickle into a cut of meat or the like comprising a pickle injection needle, said needle having a contact member extending outwardly therefrom, pickle supply means connected to said needle, said pickle supply means including a valve to control the flow of pickle to said needle, a meat cut supporting plate pivotally mounted on said frame in a generally horizontal position, an operating bar extending across the front of said plate at about the same elevation as that of said contact member when said needle is inserted into a cut resting on said plate, said operating bar being pivotally mounted on said frame, rod means connecting said bar and said valve to position the valve to stop the flow of pickle when said bar is pivotally positioned away from said plate and to reposition the valve to cause said pickle to flow when said bar is pivoted closer to said plate, and resilient means urging said bar in first mentioned position.

7. An apparatus for use in injecting pickle into a cut of meat or the like comprising a pickle injection needle member, pickle supply means connected to said needle, said pickle supply means including a valve to control the flow of pickle to said needle member, a frame having a generally horizontal surface member thereon to support the cut, one of said members being movable in a generally horizontal direction with respect to the other of said members, solenoid means to control the position of said valve, a switch device electrically connected to said solenoid means to control the position of the valve in response to the position of the switch, and a control device to actuate said switch, one of said devices being mounted on said one member for movement therewith along a path, the other of said devices being positioned in the path of movement of said one device.

References Cited in the file of this patent
UNITED STATES PATENTS

| | | |
|---|---|---|
| 1,108,755 | Hiller | Aug. 25, 1914 |
| 1,836,533 | Hasbrouch et al. | Dec. 15, 1931 |
| 2,466,772 | Kenyon | Apr. 12, 1949 |
| 2,645,171 | Moreland | July 14, 1953 |